United States Patent [19]

Lapp et al.

[11] Patent Number: 4,633,369
[45] Date of Patent: Dec. 30, 1986

[54] POWER FACTOR CORRECTION CAPACITOR

[75] Inventors: John Lapp, Franklin; Larry B. Hackney, Milwaukee, Wis.; Marco J. Mason, Racine, all of Wis.; David W. Anderson, Greenwood, S.C.

[73] Assignee: Cooper Industries, Inc., Houston, Tex.

[21] Appl. No.: 700,865

[22] Filed: Feb. 12, 1985

[51] Int. Cl.⁴ .................. H01G 4/38; A44B 21/00
[52] U.S. Cl. .................. 361/328; 24/DIG. 22
[58] Field of Search .................. 361/328–330, 361/306, 308, 310, 324; 24/5, DIG. 22

[56] References Cited

U.S. PATENT DOCUMENTS

| | | | |
|---|---|---|---|
| 632,483 | 9/1899 | Weston | 24/DIG. 22 |
| 1,832,036 | 11/1931 | Maier | 361/308 |
| 2,249,567 | 7/1941 | Reichelt | 24/5 UX |
| 2,338,485 | 1/1944 | Beyer | 361/306 X |
| 2,820,934 | 1/1958 | Mullikin | 361/308 |
| 3,093,775 | 6/1963 | Lamphier | 361/330 |
| 3,377,530 | 4/1968 | Meyers | 361/328 X |
| 3,429,819 | 2/1969 | Tierney | 361/324 X |
| 3,441,816 | 4/1969 | Butrico | 361/329 X |
| 3,457,478 | 7/1969 | Lehrer | 361/304 |
| 4,467,397 | 8/1984 | Thiel et al. | 361/328 |

FOREIGN PATENT DOCUMENTS

| | | | |
|---|---|---|---|
| 575697 | 5/1933 | Fed. Rep. of Germany | 361/310 |
| 1215259 | 4/1966 | Fed. Rep. of Germany | 361/328 |
| 834549 | 5/1960 | United Kingdom | 361/328 |

*Primary Examiner*—Donald Griffin
*Attorney, Agent, or Firm*—Nelson A. Blish; Eddie E. Scott; Alan R. Thiele

[57] ABSTRACT

A power factor correction capacitor is disclosed which includes: one generally flat elongated extended foil pack formed by wrapping a sheet of film, a wider sheet of foil, another but similar sheet of film and another but similar sheet of foil; a second generally flat elongated extended foil pack generally similar to the first pack; and at least one clip which mechanically connects one of the extended sheets of foil in the first pack with one of the extended sheets of foil in the second pack by physically piercing the extended edges of the adjacent foil ends.

10 Claims, 14 Drawing Figures

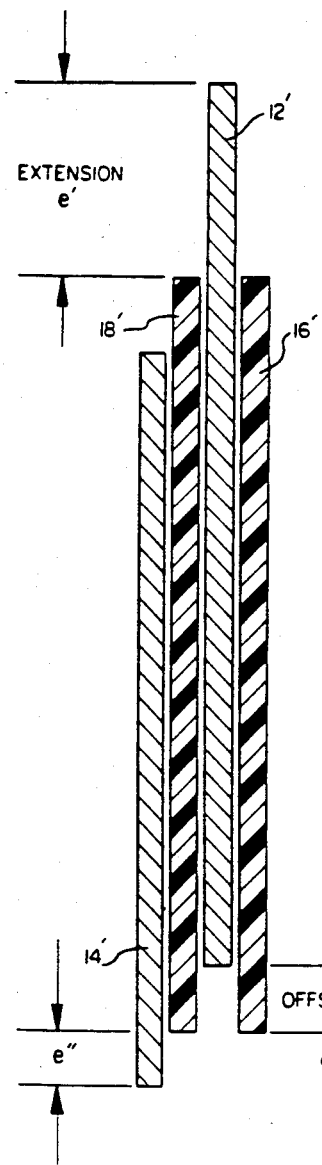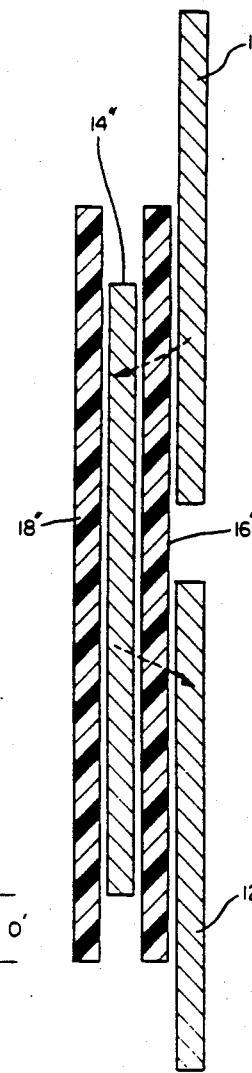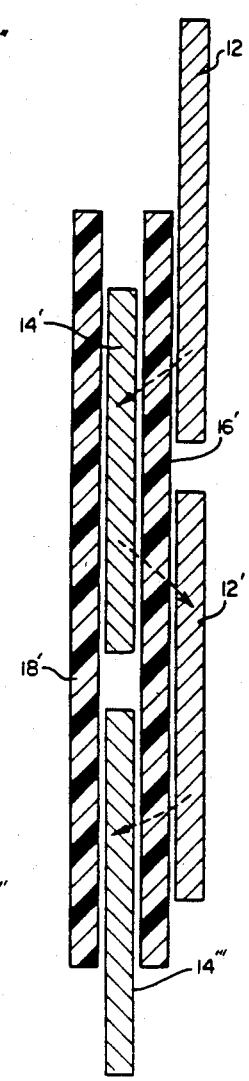

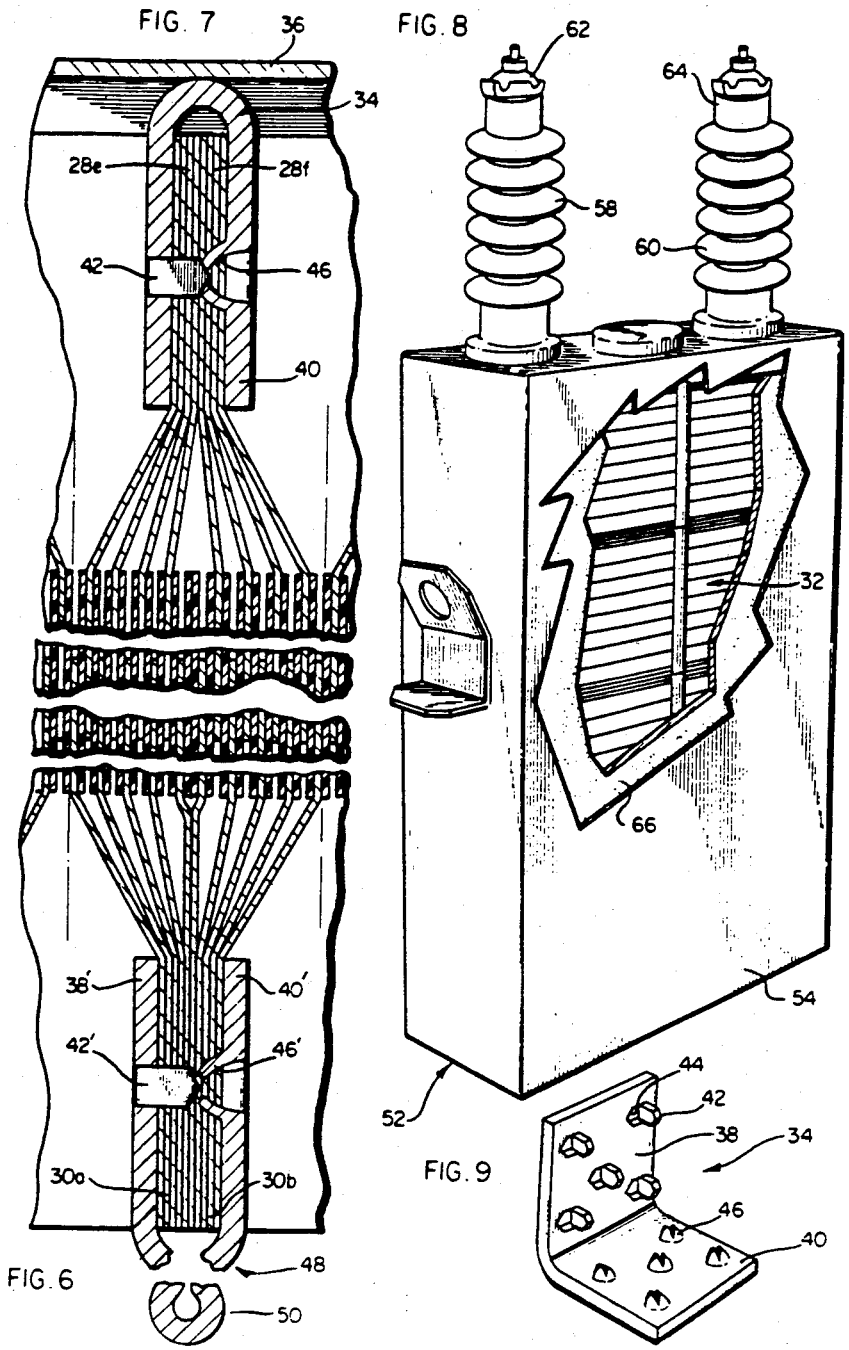

POWER FACTOR CORRECTION CAPACITOR

TECHNICAL FIELD

This invention generally relates to capacitors and, more particularly, to an improved construction for a power factor correction capacitor of the wound or rolled-foil variety.

BACKGROUND OF THE INVENTION

Conventional power factor correction capacitors of the rolled-foil variety consist of alternate dielectric film and conducting metallic foil sheets which are wound to form a compact flattened roll or pack. Conventional means for connecting the conductive sheets of a completed capacitor unit to an external electrical circuit most often include elongated terminal strips or electrodes which are inserted between overlapping foil and dielectric film sheets. The terminal strips are typically inserted during winding of the capacitor packs. These strips project in the axial direction from the wound roll and serve to axially connect conducting foils of opposite plurality therein with external terminals on the capacitor enclosing case or tank. An example of this construction is shown in U.S. Pat. No. 3,724,043 to Eustance.

This construction has not been without problems. Premature failure of a substantial number of completed capacitor assemblies has been attributed to failure of dielectric sheets at points immediately adjacent the terminal strips. Because the terminal strips tend to slip, shift, or otherwise become dislodged and misaligned within the roll in which they are inserted, almost every terminal strip requires some movement for proper adjustment and alignment. This can result in material damage. Torn and abraded portions of the dielectric sheets have been found to fail under the electrical stress of testing and operating voltages applied to completed capacitor assemblies.

There are other short comings. The aforementioned capacitor construction requires that the capacitor pack winding machines be stopped periodically so that the terminal strips, as many as up to four pair, may be inserted within the interior of the pack being wound. The acceleration of a partially wound roll immediately after a terminal is inserted in a roll, at times, creates tension forces sufficient to scratch, scuff or otherwise damage the relatively thin overlying dielectric sheets. Thus, a significant cost savings in both labor and material damage could be realized if this intermittent winding operation could be replaced by a continuous operation.

One important disadvantage of the use of separate terminal strips is that the resistive losses are relatively high. This is because a relatively long length of foil is disposed between each strip extension. Similarly, the foil strips only make physcial contact with the foil at discrete points along the length of foil.

There are other means for connecting the two foil sections of each capacitor pack. Some capacitor designs use extended foil units. These units are characterized as having the two electrode foils in each capacitor pack axially off-set from each other and from the solid dielectric material. In the assembled pack, one electrode of each foil section extends from the upper end and the other electrode extends from the lower end. Metal, such as a solder mat, is then applied to each foil end so as to form a connection point. Where direct connection of ends of adjacent sections is desired, a single continuous solder mat is applied over the adjacent foil sections to be connected. In those instances where adjacent section ends are not to be connected, a gap is left in the applied solder mat. Isolation of adjacent section ends may be facilitated by having an insulated separator between each two sections that are to be independently connected. Such a separator extends outward from the section end sufficiently to avoid contact between foil sections. One example of this construction is provided in U.S. Pat. No. 4,442,473 to Holtzman.

Unfortunately, the solder means of connection also has problems. A disadvantage of solder connections is that the hot solder may melt the insulating film between the foils and cause contamination of the dielectric fluid. Solder connections do not always make good electrical contact. This is due to the fact that it is difficult to solder to aluminum foil. Thus, for the most part the process of attaining a good solder joint in foil capacitors is difficult and costly. Solder connections are shown in U.S. Pat. No. 3,267,343 to Rayburn. The electrical connection between capacitor packs is exemplified in FIG. 2 of U.S. Pat. No. 4,442,473 to Holtzman. As a result of this difficulty, non-conventional soldering techniques have been used. For example, electron beam welding has been suggested. This is described in U.S. Pat. No. 4,301,354 to Williams; as can be expected this process is also very expensive. U.S. Pat. No. 4,467,397 to Theil et al uses metal deposited along the edges of the terminal strips. This clearly complicates fabrication.

Thus, those skilled in the art have yet to solve the problem of manufacturing a power factor correction capacitor which is reliable in operation and is inexpensive to produce without depending upon highly skilled factory workers and without major capital investment. Clearly, the industry would welcome a design that would satisfy this long felt need.

SUMMARY OF THE INVENTION

In accordance with the present invention a power factor correction capacitor is disclosed which is formed from at least one capacitor pack of the extended foil variety to which an electrical connection is made by means of a mechanical clip or fastener which pierces the extended edges of the thin foil of the pack. Several embodiments are disclosed.

In one embodiment, a capacitor is formed from an assembly which inlcudes two sheets of foil which sandwich together a sheet of dielectric film. Both the film and the foil sheets have two opposite and generally parallel edges. One of the edges of one sheet of foil is offset from or indented from the adjacent edge of the sheet of film; the other sheet of foil is offset from or indented from the adjacent edge of the sheet of film which is opposite the one edge of film, whereby each of the remaining edges of each sheet of foil extends beyond the adjacent edge of the sheet of film. A clip is used to electrically terminate one of the extended foil edges. In another embodiment an assembly of similar construction is disposed adjacent to the first assembly, whereby, in the absence of an electrical insulator, such as kraft paper, the extended foil edges of each capacitor assembly lie adjacent one another. An electrical connection is formed between the extended foil edges by means of a clip which has a set of intersecting teeth so as to form a set of jaws. By inserting the clip over the adjacent extended foil edges of the two capacitor assemblies and by forcing the teeth of the clip together and through the foil, an electrical connection is formed. In this manner a plurality of capacitors can be connected together in series or in parallel to reach whatever voltage and KVAR rating that may be needed.

Thus, in accordance with the present invention, a power factor correction capacitor is disclosed which features mechanical crimped connections to join the ends of the extended foil edges. In one embodiment TERMI-FOIL terminals manufactured by AMP Special Industries are used to form the connection. This terminal features a number of precision spaced lances which penetrate surface oxides and coatings on the foil so as to embed themselves into the foil layers when mechanical pressure is applied. This results in a very reliable connection with no need for surface preparation or time consuming soldering or expensive electron beam welding. Terminations are reliable, light, economical and quickly accomplished. More importantly, they can be applied when a capacitor is formed by winding the foil and film convolutely so as to form an oblong capacitor pack. In particular, the terminals can be applied after the capacitor pack has been wound; in other words, the winding machine does not have to be stopped periodically to insert conventional foil strip extensions. Such a connection can be made while the packs are horizontal or vertical. Since the terminals are applied to almost all of the foil extensions, resistive foil losses are reduced. Since foil terminals are not employed, this source of capacitor failure is eliminated. Similarly, the overall cost of the capacitor is reduced.

Numerous other advantages and features of the present invention will become readily apparent from the following detailed description of the invention, the various embodiments, the claims and the accompanying drawings.

BRIEF DESCRIPTION OF THE DRAWINGS

FIG. 6 is a partial, enlarged, cross-sectional side view of the left-hand end of the apparatus shown in FIG. 1, as viewed along line 6—6;

FIG. 7 is a partial, enlarged, cross-sectional side view of the right-hand end of the apparatus shown in FIG. 1, as viewed along line 7—7;

FIG. 8 is a cut-away view of a power factor correction capacitor employing the apparatus shown in FIG. 1;

FIG. 9 is a pictorial view of the clip shown in cross-section in FIG. 7; and

FIGS. 10A and 10B show the application of the invention to multiple series groups within the active dielectric area.

DETAILED DESCRIPTION

Figure 1:
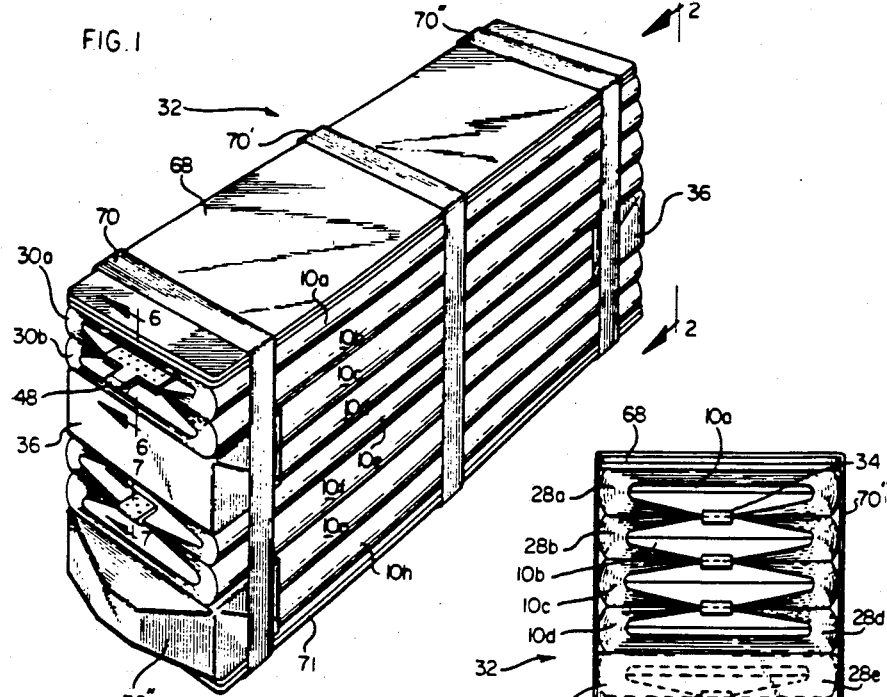
FIG. 1 is a perspective view of a set of capacitor packs of the extended foil variety which have been joined together in accordance with the present invention.

While this invention is susceptible of embodiment in many forms, there is shown in drawings and will herein be described in detail several preferred embodiments of the invention. It should be understood, however, that the present disclosure is to be considered an exemplification of the principles of the invention and is not intended to limit the invention to the specific emodiments illustrated.

Turning first to FIG. 8, a power factor correction capacitor 52 is shown. The capacitor 52, as such, includes a metal casing or tank 54 with a cover 56 sealed thereto. The capacitor 52 is provided with insulating bushing members 58 and 60 which insulate terminals 62 and 64 from the cover 56. The terminals 62 and 64 are connected by means of internal electrical connections (not shown for purposes of simplification) to a plurality of capacitor packs which are electrically connected and bundled in the form a compact module 32 which is suitable for insertion into the interior of the tank 54. Insulating material 66 electrically insulates the series groups from the tank 54. Of course, the entire tank 54 is filled with a dielectric liquid. U.S. Pat. Nos. 4,187,327 and 4,236,484 to Lapp, describe a detailed procedure for manufacturing a power factor correction capacitor of the type shown in FIG. 8. Those skilled in the art know that various dielectric liquids may be used. Of course, some have proven to be better than others. One such composition is described in U.S. Pat. No. 4,320,034 to Lapp and assigned to the assignee of the present invention.

Figure 5:
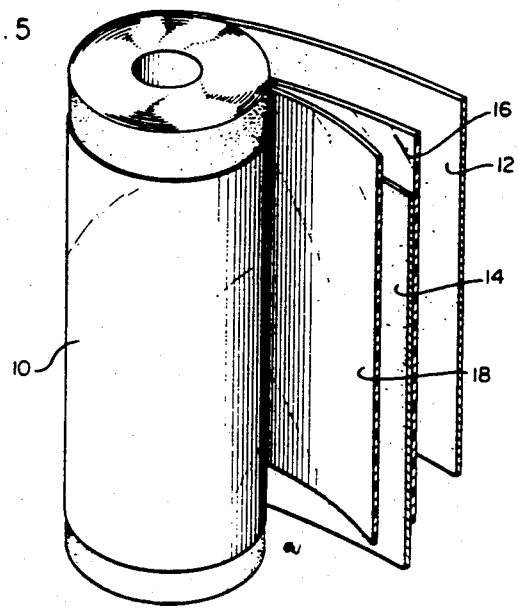
FIG. 5 is a pictorial view of the manner in which the capacitors packs are wound in forming the structure shown in FIG. 1.
Figure 5A:
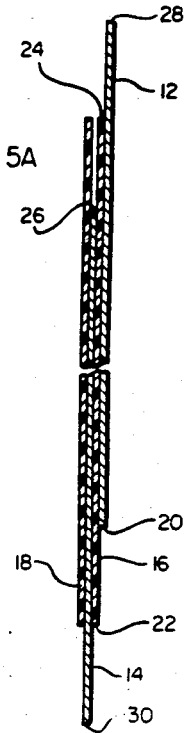
FIG. 5A is a partial cross-sectional view of the capacitor roll in FIG. 5 showing the relationship between the dielectric film and foil.

Refering now to FIG. 5, there is illustrated a convolutely wound capacitor roll 10 in a partially unrolled condition. The roll 10 includes two sheets of metallic foil 12 and 14 and two sheets of synthetic dielectric film 16 and 18, such as polypropylene. The two sheets of foil 12 and 14 and the intermediate sheet of film 16 or 18 form an elemental capacitor. Turning to FIG. 5A, in this embodiment each sheet of film 16 and 18 has a width generally similar to, but not necessarily equal to, the width of two sheets of foil 12 and 14. However, one edge 20 of one sheet of foil 12 is offset from the adjacent edge 22 of the sheet of film 16. The other sheet of foil 14 has an edge 26 which is offset from the opposite edge 24 of the sheet of film 16. Therefore each of the remaining edges 28 and 30 of each sheet of foil 12 and 14 extends beyond the corresponding adjacent edge of the sheet of film. The width of the film and foil do not have to be the same. The same result may be obtained, for example, (see FIG. 5B) by using foil 12' which is wider than the film 16' and 18'. In this manner extended foil edges may be obtained with little offset. In fact, the amount of extension e' or e" may be made independent of the amount of offset o'. Those skilled in the art known that the amount of offset is largely determined by the capacitor voltage and the insulating properties of the capacitor. As will become apparent from the following discussion, the amount that the foil is extended beyond the film is determined, in part, by the geometry of the clips added to the extended foil edges, the number of foil edges clipped together and the thickness of the capacitor packs. Because of various tolerances in the materials of construction, thermal tolerances, swelling of the liquid dielectric, and the need for fluid penetration, the capacitor roll 10 is formed with a certain degree of looseness, commonly referred to as the "space factor" or "stacking factor". After the roll 10 is formed, the roll is flattened into a generally oblong or rectangular structure. This structure is commonly referred to as a "capacitor pack". U.S. Pat. Nos. 3,829,941 3,831,234 and 3,746,953 to Lapp et al describe machines and methods which may be used to form capacitor packs.

Figure 2:
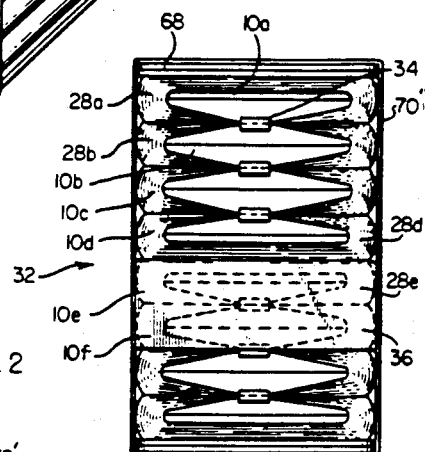
FIG. 2 is an end elevational view of the apparatus shown in FIG. 1, as viewed along line 2—2.
Figure 3:
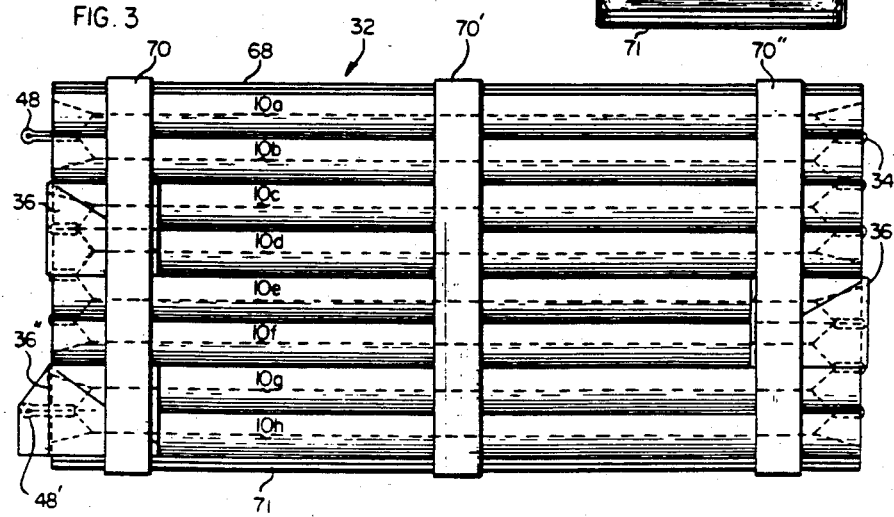
FIG. 3 is a side elevational view of the apparatus shown in FIG. 1.

Turning to FIG. 1, there is shown an apparatus which is formed by stacking together in a vertical array eight capacitor packs, each of which was formed much as that shown in FIG. 5. It will be observed that when the eight capacitor packs 10a through 10h are stacked one atop the other, the extended metallic foil edges are disposed adjacent to each other (also see FIG. 2). For example, referring to the two top capacitor packs 10a and 10b, two sets of extended foil edges 28a and 28b are disposed adjacent one another. A positive secure electrical connection between these two packs 10a and 10b is provided by means of a clip 34 (see FIG. 9). If the adjacent extended foil edges of two capacitor packs are not to be connected, a sheet of insulating material may be inserted. This is also shown in FIG. 2. In particular, insulation is provided by inserting a non-electrically conducting material, such as a sheet of electrical grade film or kraft paper 36, between the two adjacent extended foil edges 28d and 28e.

Turning now to FIG. 9 the clip 34 will now be described in detail. The clip 34, as such, is generally V-shaped so as to define two wings 38 and 40. Each wing is generally flat and defines a plurality of apertures and teeth. Preferably, the clip 34 is made from mild steel or copper which has been tin plated. Such a clip is offered by AMP Special Industries of Valley Forge, Pa. under the trademark TERMI-FOIL. That particular clip is made from copper per QQ-C-576 and finished with tin plating per MIL-T-10727 or nickel plating per QQ-N-290, or cleaned and left unplated. As shown in FIG. 9, one wing 38 of the clip 34 has five teeth 42 which are formed by severing the basic metal along three edges and then lifting or bending the remaining material away from the plane of the base so that it is at generally right angles to the plane of the wing. As such, each tooth 42 is immediately adjacent a similarly shaped aperature 44. The other wing 40 of the clip 34 also has five apertures and a plurality of teeth 46 for each aperture. These teeth may be formed by piercing or punching the plane of the wing 40 in the form of an "X" so that four upstanding members are formed. Those skilled in the art know that there are certainly other ways to form a series of apertures and teeth which are adapted to puncture aluminum foil. It should also be understood that, since the clip 34 holds together adjacent extended foil edges, the clip need not itself be made of metal.

Turning now to FIG. 7 the manner in which the clip 34 is inserted over the extended foil edges of two adjacent packs 10e and 10f is illustrated. Simply stated, the clip 34 is disposed over the extended edges 28e and 28f of two adjacent capacitor packs 10e and 10f, and then the two wings 38 and 40 are forced together such that two oppositely disposed set of teeth 42 and 46 come into registration by puncturing or piercing several folds or extended edges of the sheet of metal foil. The fact that the foil is only about 0.25 mils in thickness and that an adequate bite can be obtained without ripping or tearing is totally surprising. Even more surprising is that, contrary to what might be predicted by those of ordinary skill in the art, one can obtain a superior electrical and mechanical connection which meets the high reliability standards required for power factor capacitors.

Figure 4:
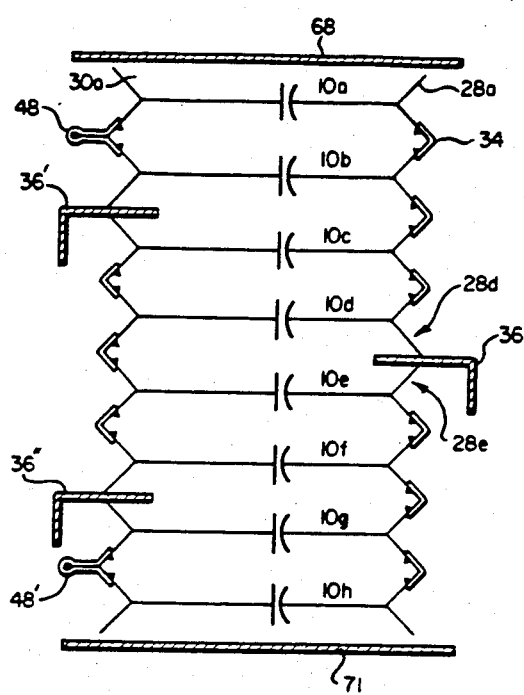
FIG. 4 is a pictorial representation of the electrical circuit defined by the apparatus shown in FIG. 1.
Figure 4A:
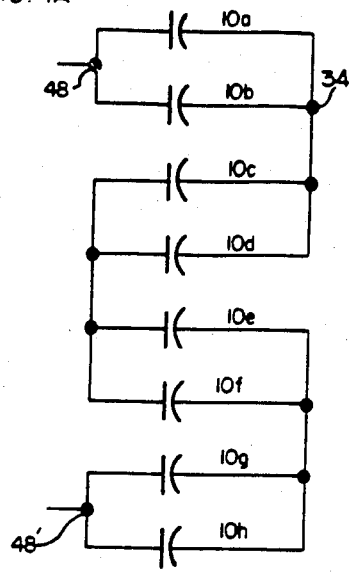
FIG. 4A is a conventional circuit diagram of the electrical structure embodied in FIG. 1.

Referring now to FIGS. 4 and 4A, capacitor packs 10a and 10b are electrically in parallel with each other and in series with the parallel combination of capacitor packs 10e and 10d. As such, capacitor packs 10a and 10b form a "series-group". Of course, more than two capacitor packs may be joined together in parallel to form a series group. Thus, the structure shown in FIG. 1 is comprised of four series groups with two capacitor packs connected in parallel in each series group.

The clip 48 shown in FIG. 6 is basically similar to the clip 34 shown in FIG. 9. There is one major difference. Here the clip 48 shown in FIG. 6 is provided with an eye 50 at the end or at the "bight" portion of the two wings 38' and 40'. As such the clip 48 also functions as a terminal. By inserting a wire into the eye 50, electrical connections may be made between the end "series-groups" and the external terminals 62 and 64 of the capacitor or between a plurality of "series-groups".

One or more series groups may be conveniently bundled together for ease in insertion into a capacitor tank. In FIGS. 1 and 8, four series groups are bundled together to form a modular structure 32. In other words, this structure 32 is formed by:

1. Stacking eight capacitor packs 10a through 10h one atop the other;
2. Placing one or more sheets of electrical insulating board 68 and 71 at each end of the stack of capacitor packs so as to provide rigidity to the structure;
3. Inserting one or more sheets of insulating paper 36, 36' and 36" to separate those adjacent extended foil ends which are not to be electrically connected;
4. Compressing the packs together so as to achieve the desired dimension and spacing (i.e., stacking factor or space factor);
5. Binding together the composite structure with bands 70, 70' and 70" of insulating material, such as linen cloth or plastic bands, to maintain the desired stacking factor;
6. Crimping together those extended foil sections needed to achieve desired number of series groups;
7. Folding the insulating paper separators 36, 36' and 36" so as to allow easy insertion of the completed structure 32 into the capacitor tank 54; and
8. Making the electrical connections between similar series group terminals 48 and 48' or to the capacitor tank terminals 62 and 64.

The importance of this invention should not be under estimated. For example, at present, the scrap rate associated with the winding of capacitor packs at a typical factory is in the hundred thousand dollar range per year. Engineering runs have indicated that by removing the electrodes, the scrap rate will be reduced by almost fifty percent. Even more important is that many factories are capacity limited by the winding operation (i.e., the winding room becomes the plant "bottleneck"). Thus, the invention enables one to achieve increased factory capacity without a major capital investment. Thus, the industry is expected to quickly practice the teachings of this invention once the invention is made known to the public.

From the foregoing, it will be observed that numerous variations and modifications may be effected without departing from the true spirit and scope of the novel concept of the invention. For example, although one sheet of dielectric film is illustrated to separate adjacent sheets of foil, more conventional capacitors may be formed by using multiple sheets of film or paper or a combination of paper and film. Similarly, while the invention has been described using one series-group within the active or working area of the dielectric, multiple series groups may be utilized; such constructions are shown in FIGS. 10A (two series groups) and 10B (three series groups). Also multiple and single series groups can be combined. It is to be understood that no limitation with respect to the specific aparatus illustrated herein is intended or should be inferred. Thus, energy storage capacitors may also be formed using the principles of the present invention. It is, of course, intended to cover by the appended claims all such modifications that fall within the scope of the claims.

We claim:

1. A power factor correction capacitor, comprising:
    one capacitor pack formed from two sheets of foil sandwiching at least one sheet of dielectric, one sheet of foil having two opposite edges and said one sheet of dielectric having two opposite edges with one of the edges of said one sheet of foil extending beyond the adjacent edge of said one sheet of dielectric and the adjacent edge of the other sheet of foil;
    clip means, piercing said one edge of said one sheet of foil, for electrically terminating said one sheet of foil in said one capacitor pack;
    a second capacitor pack formed from two sheets of foil sandwiching at least one sheet of dielectric film, one sheet of foil having two opposite edges and said sheet of film having two opposite edges with one of the edges of said one sheet of foil in said second capacitor pack extending beyond the adjacent edge of said sheet of film and beyond the adjacent edge of the other sheet of foil in said second pack and with said one edge disposed adjacent to said one edge of said one sheet of foil in said one capacitor pack; and
    wherein said clip means pierces said one edge of said sheet of foil in said one capacitor pack and said one edge of said one sheet of foil in said second capacitor pack,
    whereby one of the sheets of foil in said one capacitor pack is electrically connected to one of the sheets of foil in said second capacitor pack.

2. The capacitor set forth in claim 1, wherein said two sheets of foil in said one capacitor pack and said second capacitor pack have a width generally equal to the width of said sheet of dielectric, whereby the other edge of said one sheet of foil is indented from the other edge of said one sheet of dielectric.

3. The capacitor set forth in claim 2, wherein the other sheet of foil in said one capacitor pack and said second capacitor pack has two opposite edges with one of said edges extending beyond said other edges of said sheet of dielectric in said one capacitor pack.

4. The capacitor set forth in claim 3, further including second clip means, piercing said one edge of said other sheet of foil in said one capacitor pack, for electrically terminating the other sheet of foil in said one capacitor pack.

5. The capacitor set forth in claim 1, wherein said one capacitor pack and said second capacitor pack comprise two sheets of foil and two sheets of dielectric film which are alternately layered and convolutely wound about each other so as to form a cylinder, said cylinder being flattened to form a generally rectangular elongated structure.

6. The capacitor set forth in claim 1, wherein said clip means comprises:
    a. a first element defining a generally flat plane and a plurality of teeth which are disposed generally perpendicular to the plane of said element and which are adapted to pierce the foil comprising said first capacitor pack and said second capacitor pack;
    b. a second element defining a generally flat plane and a plurality of apertures adapted to receive said teeth; and
    c. means, connecting said first and said second elements, for generally inelastically holding at least one of said teeth in alignment with one of said apertures.

7. The capacitor set forth in claim 1, wherein:
    said clip means comprises two generally flat rectangular metal members which are joined together along a common edge so as to form a generally V-shaped structure;
    wherein one of said members defines a plurality of apertures; and
    wherein the other member defines a plurality of teeth radially aligned to said apertures in said one member, said apertures being brought into registration with said teeth by forcing together said two members and exceeding the elastic limit of said metal members.

8. A power factor correction capacitor, comprising:
    a. one capacitor pack formed from two sheets of foil sandwiching at least one sheet of dielectric, one sheet of foil having two opposite edges and said one sheet of dielectric having two opposite edges with one of the edges of said one sheet of foil extending beyond the adjacent edge of said one sheet of dielectric and the adjacent edge of the other sheet of foil;
    clip means, piercing said one edge of said one sheet of foil, for electrically terminating said one sheet of foil in said one capacitor pack;
    wherein said two sheets of foil have a width generally equal to the width of said sheet of dielectric, whereby the other edge of said one sheet of foil is indented from the other edge of said one sheet of dielectric;
    wherein the other sheet of foil in said one capacitor pack has two opposite edges with one of said edges extending beyond said other edge of said sheet of dielectric in said one capacitor pack;
    another capacitor pack formed from two sheets of foil sandwiching at least one sheet of dielectric, each of said sheets of foil having two opposite edges, said sheet of dielectric having two opposite edges and a width generally equal to the width of said two sheets of foil with one edge of one sheet of foil offset in one direction relative to the adjacent edge of said one sheet of dielectric and with one edge of the other sheet of foil offset in the opposite direction from the other edge of said sheet of dielectric, whereby each remaining edge of each sheet of foil extends beyond the corresponding adjacent edge of said sheet of dielectric; and
    clip means, piercing one of the extended sheets of foil in said one capacitor pack and one of the sheets of foil in said another capacitor pack, for electrically connecting one of the sheets of foil in said first capacitor pack with one of the sheets of foil in said another capacitor.

9. Apparatus, comprising:
a. a first sheet of thin metallic foil defining two edges which are generally parallel to one another and separated by a first distance;
b. a first sheet of dielectric film defining two lateral edges which are separated by a distance which is generally equal to said first distance, one of said two lateral edges of said first sheet of film being offset from one of the two edges of said first sheet of foil, whereby the other edge of said first sheet of foil extends beyond the other edge of said first sheet of film;
c. a second sheet of thin metallic foil defining two parallel edges which are separated by distance generally equal to said first distance, one of said two parallel edges of said second sheet of foil being offset from and disposed upon said one edge of said first sheet of film, whereby the other edge of said second sheet of foil extends beyond said other edge of said first sheet of film;
d. a third sheet of thin metallic foil aligned to said first sheet of foil and defining two spaced apart edges which are separated by said first distance with one of said two spaced apart edges aligned with said one edge of said first sheet of foil;
e. a second sheet of dielectric film aligned to said first sheet of film and defining two lateral edges which are separated by said first distance, one of said two lateral edges of said second sheet of film being offset from said one spaced apart edge on said third sheet of foil;
f. a fourth sheet of thin metallic foil defining two parallel edges which are separated by a distance generally equal to said first distance, one of said two parallel edges of said fourth sheet of foil aligned to said third sheet of foil and being offset from said one parallel edge of said second sheet of film, whereby the other edge of said fourth sheet of foil extends beyond the other edge of said second sheet of film;
g. spacing means, disposed between said second sheet of foil and said third sheet of oil, for spacing said second sheet of foil from said third sheet of foil;
h. mechanical means, for holding said first sheet of foil in contact with said third sheet of foil;
wherein said mechanical means comprises:
i. a first metal member defining a generally flat plane and a plurality of teeth which are disposed generally perpendicular to the plane of said first member and which are adapted to pierce said first sheet of foil and said third sheet of foil;
j. a second metal member defining a generally flat plane and a plurality of apertures adapted to receive said teeth; and
k. means, connecting said first and said second metal members, for inelastically holding at least one of said teeth in alignment with one of said apertures.

10. The capacitor set forth in claim 9, wherein said mechanical means comprises two generally flat rectangular metal members which are joined together along a common edge so as to form a generally V-shaped structure;
wherein one of said members defines a plurality of apertures; and
wherein the other member defines a plurality of teeth radially aligned to said apertures in said one member, said apertures being brought into registration with said teeth by forcing together said two members and piercing said first sheet of foil and said third sheet of foil.

* * * * *